Figure 1:
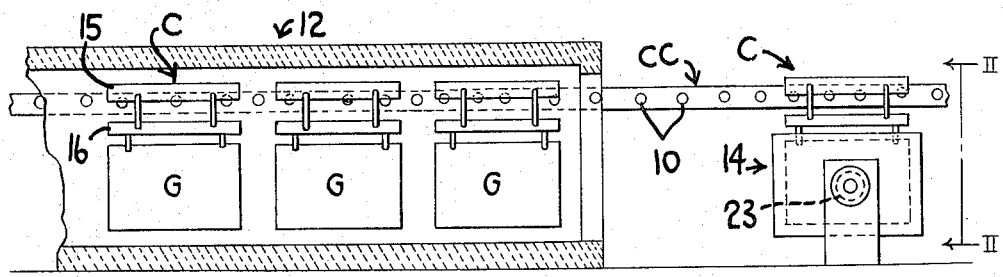

Dec. 6, 1966     D. L. THOMAS     3,290,133

METHOD AND APPARATUS FOR PRESS BENDING GLASS SHEETS

Original Filed March 2, 1964

INVENTOR
DEAN L. THOMAS

BY     Chisholm and Spencer

ATTORNEYS

United States Patent Office 3,290,133
Patented Dec. 6, 1966

3,290,133
METHOD AND APPARATUS FOR PRESS BENDING GLASS SHEETS
Dean L. Thomas, Crestline, Ohio, assignor to Pittsburgh Plate Glass Company, Pittsburgh, Pa., a corporation of Pennsylvania
Original application Mar. 2, 1964, Ser. No. 348,373. Divided and this application Feb. 15, 1966, Ser. No. 527,680
7 Claims. (Cl. 65—106)

The present application is a division of application Serial No. 348,373, filed March 2, 1964, for Method of Press Bending a Vertical Suspended Sheet and Apparatus Therefor, now abandoned. The latter, in turn, is a continuation-in-part of application Serial No. 113,853 for Shaping Glass, filed May 31, 1961, now abandoned, and a continuation-in-part of application Serial No. 132,097, filed August 17, 1961, now abandoned.

The present invention relates to treating glass and particularly refers to improvements in shaping glass sheets wherein a heat-softened glass sheet is supported in spaced relation between two complementary shaping members and is shaped by being sandwiched between said shaping members while in a plastic condition.

Flat glass sheets are shaped successively by heat-softening followed by sandwiching the major surfaces of each heat-softened glass sheet between a pair of glass shaping members having complementary convex and concave shaping surfaces opposing one another. During a typical operation, the glass sheets are gripped near their upper edges by tongs. The latter are suspended from carriages which are conveyed along a horizontal path of a conveyor that extends through a furnace and a glass shaping station.

During the heating that softens the glass before it is shaped, the tongs provide a pair of gripping forces opposing one another through the thickness of the glass sheet. Each glass sheet is suspended in a vertical plane from the tongs. Normally more than one set of tongs is needed to support a flat glass sheet.

Many devices have been developed to insure that flat glass sheets are properly suspended initially from a plurality of sets of tongs. Proper loading reduces the likelihood that each set of tongs will apply a twisting force that distorts the glass and imposes a defect known as a kink therein. When glass is loaded properly, the gripping force applied thereto by each set of tongs is substantially equal to that applied by each other set of tongs.

Each pair of tongs exerts a pull in a substantially vertical direction at each glass gripping region gripped by a pair of tongs. When the glass sheet is heat-softened, its low viscosity at elevated temperatures permits the glass to distort in the vicinity of each gripping region and form a convex bump in the upper edge of the supported glass sheet. The effect of this pulling is minimized when the proportion of the glass weight borne by each pair of tongs is minimized.

An optimum condition is obtained when the number of tongs used is increased and an equal portion of the glass weight is borne by each pair of tongs. However, the complexity of loading a glass sheet increases with the number of pairs of tongs used. Therefore, a compromise is usually made to limit the number of pairs of tongs used to the minimum needed to support the glass sheet and obtain an upper edge distorsion within acceptable tolerance.

When the prior art techniques for gripping a flat glass sheet by a plurality of tongs are employed for tempering flat glass sheets, the defects due to kinking and pulling are reduced substantially. However, when the flat glass sheets are shaped into curved configurations, the prior art criteria for suspending flat glass sheets properly are insufficient to avoid this defect.

When a bend about a vertical axis is imparted to a flat glass sheet, the glass shaping members displace the glass regions gripped by the tongs into different vertical planes from the original vertical plane occupied by these regions when the glass was flat. Since the gripping force applied to the heat-softened glass sheet by the glass shaping members is much greater than that applied through the tongs, and the gripping members of the tongs are pivoted about an overhead axis defined by a structural member from which the tongs are suspended, the gripping members of the tongs tend to pivot upwardly while the softened glass sheet is sandwiched throughout substantially its entire extent between the glass shaping members. Therefore, prior art tongs tend to kink the softened glass because the axis between the glass gripping members (or tong points, as they are called in the prior art) deviate from the original direction normal to the major flat glass surfaces by an amount dependent upon the severity of bend imparted to the glass sheet.

When glass sheets are shaped into a bending curve having a horizontally disposed axis of curvature, the outermost portion of the shaping surface of the convex shaping member makes line contact with one major surface of the flat glass sheet a substantial distance below its upper edge portion gripped by tongs. During this type of shaping operation, the upper and lower edges of the concave shaping member make line contact with the other major surface of the flat glass sheet adjacent its upper and lower edges.

As the shaping members contact the heat-softened glass sheet, the outermost portion of the convex shaping member originally in line contact with the suspended glass sheet increases its area of contact with one major surface of the glass sheet in the region of initial contact spaced from the upper edge portion gripped by the tongs. As the convex shaping member moves inwardly, it impresses its curvature on the glass sheet along areas of contact that increase upwardly and downwardly from the line of initial contact until it contacts substantially the entire surface of the glass sheet that it faces. The upper and lower lines of conact between the concave shaping member and the deforming glass sheet do not increase in area until the very end of the glass shaping operation. Hence, the frictional pressure between the convex shaping member and the glass sheet tends to increase during the glass shaping operation, thus causing the region of original contact between the outermost portion of the convex shaping member and the glass sheet to be fixed in position in a plane defined by the axis of movement of the outermost portion of the convex shaping member.

In prior art devices, the shaping members were moved along parallel axes normal to the vertical plane which the flat glass sheet occupied while gripped by the tongs during its heating. Many glass sheets shaped while gripped by tongs were rejected because of vents originating at the tong marks. Many other fabricated products were rejected because their upper edges formed a rounded contour immediately above the regions gripped by the tongs.

The present invention suggests several solutions to reduce stress in glass sheets while undergoing press bending. The various aspects of the present invention enumerated below may be used singly or in combination with one another as required, depending on the size and shape of the product to be fabricated.

One aspect of the present invention arose when applicant realized that the horizontal motion of the prior art shaping members against the opposite surfaces of the vertically heat-softened glass sheet was causing the central region of the suspended glass sheet to be fixed in a horizontal plane and that the shortening of the vertical dimension of the glass sheet as it was shaped about an axis extending horizontally caused a downward pull on the regions of the glass sheet gripped by the glass gripping members of the tongs. This downward pull was discovered to be the cause of the vents at the tong marks and also of the distortion in the upper edge of the glass sheets.

The first aspect of the present invention avoids these causes of defects in the glass by providing the glass shaping members with an obliquely upward motion having a vertical component of motion substantially equal to the lowering of the regions of the glass sheet gripped by the tongs in response to the shortening of the vertical dimension of the glass sheet during the glass shaping operation as the glass shaping members move from the initial points of contact with the opposite major surfaces of the flat glass sheet until their movement toward one another is completed. According to the present invention, the more sharply the glass sheet is bent about a horizontal axis, the greater must be the upward tilt of the movement of the glass shaping members.

Another factor to consider in determining the angle of upward tilt for moving the glass shaping members, in addition to the sharpness of bend imposed on the glass, occurs when the glass is shaped outside the heating furnace. In such a case the vertical distance between the gripping elements of the tongs and the overhead conveyor from which the tongs are suspended is lessened considerably due to the fact that the temperature of the tongs is reduced once the tongs and the gripped glass sheet leaves the relatively hot furnace and enters the relatively cool shaping station. This cooling continues during the time the shaping members continue their relative movement toward one another after having made initial contact with the opposite major surfaces of the flat glass. Shortening of the tongs results in a force tending to lift the gripping points, while the central region of the glass is rigidly held in position by virtue of the relatively large frictional force between the glass major surface and the convex shaping member. Hence, unless this additional change in vertical distance between the horizontal plane containing the axis connecting the opposing tong points and the horizontal plane containing the initial point of contact between the convex shaping member and the glass is compensated for, the defects resulting from prior art horizontal displacement of the opposing shaping members are not eliminated completely.

The main object of the present invention is to reduce stresses resulting from a press bending operation wherein a glass sheet is supported by a glass supporting member in a vertical plane, heated to its softening point and its major surfaces sandwiched between glass shaping members having complementary convex and concave shaping surfaces opposing one another to bend the glass sheet into a shape conforming to said complementary shaping surfaces, wherein the pressure resulting from sandwiching the glass sheet between said glass shaping members causes said glass supporting member to stress the glass sheet.

Specifically, it is an object of one embodiment of the present invention to minimize losses in producing press shaped glass sheets, particularly upper edge distortion and vents due to pulling forces between the glass gripping tongs and the shaping members along a direction parallel to the major glass sheet surfaces and to minimize kinks in press shaped glass sheets due to twisting forces applied by the tongs on the glass sheets.

The above and other objects will be understood better after the reader has studied the description of a typical illustrative embodiment of the invention which follows.

Figure 2:
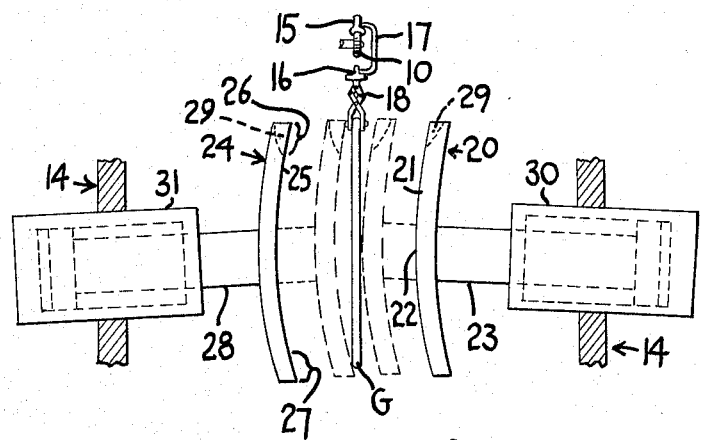
Figure 3:
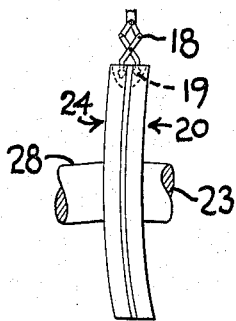

In the drawings which form part of the description of the illustrative embodiment and wherein like reference numerals are applied to like structural elements, FIG. 1 is a fragmentary longitudinal view of a typical furnace and glass shaping station in which the first aspect of the present invention may be employed successfully;

FIG. 2 is a fragmentary transverse view of a glass shaping station taken along the lines II—II of FIG. 1 showing the glass shaping members in retracted position and also showing the paths of movement taken by the complementary glass shaping members from their retracted position to the position wherein the convex shaping member makes initial contact with one major surface of the glass sheet to be shaped;

FIG. 3 is a fragmentary view similar to that shown in FIG. 2 showing the glass shaping members in their closed position sandwiching the bent glass sheet.

Referring to the drawings, reference number 10 refers to the driving rolls of a carriage conveyor CC for moving carriages C along a horizontal path through the upper portion of a tunnel-like furnace 12 and a glass shaping station 14. Each carriage C is composed of a cast iron alloy and comprises an upper beam 15 that rides on rolls 10 and a lower beam 16 interconnected to the upper beam 15 by a pair of arcuately shaped vertically extending connecting or coupling rods 17. The lower beam 16 of each carriage C has suspended therefrom a pair of steel alloy glass gripping tongs 18 or glass engaging members which grip a supported glass sheet G at two spaced points along its upper edge. Each tong has a pair of glass gripping elements 19 that apply opposing forces through the glass thickness to hang the glass sheet G therefrom in a vertical plane.

Referring to FIG. 2, the glass shaping station 14 comprises a convex glass shaping member 20 having a convex shaping surface 21, whose outermost portion is indicated by reference number 22. An actuating piston 23 is mounted to the rear of convex glass shaping member 20 to urge the latter to move along the axis defined by the length of its piston rod toward and away from the vertical plane occupied by the glass sheets G in succession.

At the other side of the vertical plane occupied by the glass sheets, the glass shaping station 14 comprises a concave glass shaping member 24 having a concave shaping surface 25 which conforms to and is substantially complementary to the convex shaping surface 21 of convex glass shaping member 20. The difference in shape between shaping surfaces 21 and 25 permits the insertion of a glass sheet of finite thickness therebetween.

Reference number 26 refers to the upper edge portion of the concave shaping surface 25, whereas reference number 27 refers to the lower edge portion of the concave shaping surface 25. An actuating piston 28 is mounted to the rear of concave glass forming member 24 to urge the latter to move along the axis defined by the length of the piston 28.

Glass shaping members 20 and 24 are composed of a a rigid heat resistant material such as stainless steel provided with a covering of fiber glass or asbestos or the like at their shaping surfaces. When they are in mating engagement with one another and sandwiching a glass sheet G therebetween, clearance must be provided for the tongs 18. These clearances or notched out portions are depicted by reference characters 29.

Pistons 23 and 28 are movably mounted in piston cylinders 30 and 31, respectively, to urge the glass shaping members 20 and 24 toward and away from mating engagement with one another. Piston cylinders 30 and 31 are rigidly attached to the structural support for the glass shaping station 14.

In the past, pistons 23 and 28 have been mounted for movement along horizontal paths directly opposed to one another. The improvement provided by the first aspect of the present invention is the slight upward tilting of the axis of inward movement of the pistons to cause the complementary glass shaping members 20 and 24 to move upwardly a vertical distance equal to the distance that the portion of the glass sheet initially contacted by convex shaping member 20 would move upwardly from the time it is contacted by the outermost portion 22 of the convex shaping surface 21 until the complementary pressing members 20 and 24 are retracted from one another after the glass is shaped by pressurized contact with the shaping members, if the glass were not constrained from movement by the force applied to the glass by the convex glass shaping member 20.

This upward motion of the portion of the glass sheet initially contacted by the outermost portion 22 of the convex shaping surface 21 of the convex glass shaping member 20 results from two causes:

(1) Shortening of the vertical dimension of the glass sheet when it is bent about a horizontal axis;

(2) Shortening of the glass supporting means including the vertical dimension of the connector rods 17 and tongs 18 as well as carriages C and the glass sheets G due to their being cooled upon leaving the relatively hot atmosphere of the furnace 12 for the relatively cool atmosphere of the glass shaping station 14. A certain amount of thermal contraction accompanies such cooling.

Unfortunately for the prior art, these tendencies for the earliest contacted portion of the glass sheet to move upwardly in response to these factors were not unrestrained. Instead, the friction between the outermost portion 22 of convex shaping surface 21 and the glass sheet G produced a constraint on the glass opposing the tendency of this portion to move upwardly. The net result of the upward movement of the glass gripping elements 19 of the tongs 18 and the forcing of the upper edge of the glass sheet downwardly as the vertical dimension of the glass sheet decreased caused a pull on the heat-softened glass sheets that distorted the upper edge of the glass sheets, caused enlargement of the area of contact between the glass and the glass gripping elements of the tongs that increased the tendency of vents to form in the glass and also in some extreme cases pulled the glass completely out of gripping relation with the tongs.

After the glass sheet has been shaped by pressurized engagement of the glass shaping members on opposite surfaces thereof as described above, the actuating pistons then retract both glass shaping members to permit the shaped glass sheet to move rapidly from the glass shaping station 14 to a glass quenching station (not shown) and prepare the glass shaping station for receipt of the next glass sheet to be formed by press bending.

Many devices may be used to control the sequence of operation of the glass shaping members described hereinabove. For example, timing circuits may be interconnected to one another and to the actuating pistons 23 and 28 in such a manner as to provide the necessary sequence of operation.

In order to provide a complete disclosure, typical commercial operation exemplifying the various aspects of the present invention will be described.

*Example I*

The following details are supplied of a typical operation to produce curved side lights of tempered glass 16 inches high, 28 inches long and of nominal thickness of ¼ inch bent to a uniform radius of curvature of 60 inches. Glass sheets were heated gradually for a period of about 4 minutes to a surface temperature of about 1225° F. During this heating phase the sheets were conveyed through a tunnel-like furnace at a constant speed. When the previous glass sheet had been shaped and the glass shaping member were being separated, the furnace exit door opened and the next sheet moved to the glass shaping station. About 4 seconds elapsed in moving the sheet to its proper position at the glass shaping station.

The glass shaping members were moved obliquely upwardly toward one another in tilted paths having a vertical component of motion of ¾ inch and a horizontal component of motion of 12 inches after the glass sheet was indexed properly. It took about 2 seconds for the glass shaping members to close and impress their shapes onto the opposite major surfaces of the heat-softened glass sheet. The glass shaping members were held in pressurized contact with the opposite surfaces of the glass sheet for about 2 seconds and then were retracted to receive the subsequent heat-softened sheet therebetween for shaping.

The height of a glass sheet 16 inches high bent to a uniform radius of curvature of 60 inches is reduced by about 0.3 inch as it is shaped. The maximum depth of bend is about $17/32$ inch (0.53 inch). By having the outermost portion of the convex member make initial contact with the center of the glass sheet, an upward component of motion of about $1/64$ inch (.016 inch) was needed to compensate for the shortening of the vertical dimension of the sheet from the time the convex glass shaping member made initial contact therewith until the inward movement was completed.

The upward slope of 1 part in 16 employed in the present example raised the glass shaping members about $1/32$ inch during the time that they were completing their shaping of the glass sheet after having made their initial contact. The difference between the compensation for the shortening of the vertical dimension of the glass and the amount of the upward component of motion applied to the glass shaping members was needed to compensate for the shortening of the 16 inch vertical dimension of the vertically extending connector rods of the carriages and of the tongs, which was reduced by approximately $1/64$ inch during the time the glass shaping members were completing their pressurized contact with the glass.

It is understood that the principles described above must be followed in modified form as the depth and complexity of bend varies, but that they are needed to produce either simple bends in which the glass is bent about a horizontal axis of bending or a compound bend wherein the glass is bent about more than one axis of bending including one having a horizontal component.

Also, when a glass sheet is supported along its bottom edge for shaping about a horizontal and/or a vertical axis of bending, oblique upward and inward movement by the glass shaping members while engaging the glass lifts the glass sheet out of contact with the bottom edge support during its shaping, thereby avoiding the stresses that would be established in the glass bottom edge that would otherwise result from its rubbing against the glass support member during its shaping. The distance the bottom edge is lifted is a small fraction of an inch, so that the glass may be redeposited upon the bottom edge without damage when the glass shaping members are retracted.

A description of certain illustrative embodiments of the present invention has been made for the purpose of illustration and many equivalent methods of operation will become obvious in the light of the present disclosure. For example, the glass sheet may be supported by supporting elements or members other than tongs during the press bending operation, such as on wires or refractory blocks that support the glass sheet along its bottom edge. The term "support" as used in this specification is meant to be generic to both bottom edge support and tong suspension. Reference to the scope of the present invention may be obtained from the claimed subject matter which follows.

What is claimed is:

1. The art of bending glass sheets wherein a flat glass sheet is hung from glass gripping tongs that grip the glass at tong gripping points near its upper edge, heated to its softening point in a relatively hot atmosphere and its major surfaces sandwiched between a pair of glass shaping members having complementary convex and concave shaping surfaces opposing one another to bend the glass sheet into a shape conforming to said complementary shaping surfaces in a relatively cool atmosphere wherein the vertical distance normally between the tong gripping points and the initial line of contact between the convex shaping surface and the glass sheet changes upon bending the latter thereby tending to pull the glass sheet out of gripping engagement by the glass gripping tongs when the complementary shaping surfaces engage the opposite major surfaces of the flat glass sheet, the improvement comprising simultaneously moving the opposing glass shaping members toward one another in paths that have a slight upward inclination whose vertical component of motion is substantially equal to the change of the normal vertical distance of the gripped glass sheet between the portion thereof gripped by tongs and the portion thereof that first comes into contact with the outermost portion of the convex shaping surface of said shaping member having said convex shaping surface.

2. In the art of bending glass sheets wherein a flat glass sheet is hung from glass gripping tongs that grip the glass at tong gripping points near its upper edge, heated to its softening point and its major surfaces sandwiched between a pair of glass shaping members having complementary convex and concave shaping surfaces defining curvatures about a horizontal axis of curvature opposing one another to bend the glass sheet into a shape conforming to said complementary shaping surfaces, wherein said shaping member of convex shape makes its initial contact with the hung glass sheet along a horizontal axis spaced vertically below the tong gripping points, thereby establishing a force that tends to pull the upper edge of the glass sheet downwardly out of gripping engagement by the tongs when the glass sheet is shaped about said horizontal axis, thereby shortening the normal vertical dimension of the glass sheet, the improvement comprising simultaneously moving the opposing glass shaping members toward one another in paths that have a slight upward inclination whose vertical component of motion is substantially equal to the shortening of the normal vertical distance of the gripped glass sheet between the portion thereof gripped by tongs and the portion thereof that first comes into contact with the outermost portion of the convex shaping surface of said shaping member having said convex shaping surface.

3. In the art of bending glass sheets wherein a flat glass sheet is hung from gripping elements of glass gripping tongs that grip the glass at glass gripping points near its upper edge, the tongs are suspended by tong suspension structure from an overhead horizontal conveyor and the glass, the tongs and the tong suspension structure are heated to glass softening temperature in a relatively hot atmosphere and the major surfaces of the glass sheet are sandwiched between a pair of glass shaping members having complementary convex and concave shaping surfaces defining curvatures about a horizontal axis of curvature opposing one another to bend the glass sheet into a shape conforming to said complementary shaping surfaces in a relatively cool atmosphere, wherein said shaping member of convex shape makes its initial contact with the hung glass sheet along a horizontal axis spaced vertically below the tong gripping points, thereby shortening the normal vertical dimension of the glass sheet and the gripping elements are urged to rise by thermal contraction of said tongs and said tong suspension structure during said sandwiching, thereby establishing a force that tends to pull the upper edge of the glass sheet downwardly out of gripping engagement by the tongs when the glass sheet is shaped about said horizontal axis, the improvement comprising simultaneously moving the opposing glass shaping members toward one another in paths that have a slight upward inclination whose vertical component of motion is substantially equal to the sum of the distance of the upward movement of said gripping elements as the tongs are shortened by virtue of their cooling resulting from their exposure to said relatively cool atmosphere and the shortened distance of the normal vertical distance of the gripped glass sheet between the portion thereof gripped by tongs and the portion thereof that first comes into contact with the outermost portion of the convex shaping surface of said pressing member having said convex shaping surface, 4. In the art of bending glass sheets wherein a flat glass sheet is supported by a glass supporting member, heated to its softening point and its major surfaces sandwiched between a pair of glass shaping members having complementary convex and concave shaping surfaces opposing one another to bend the glass sheet into a shape conforming it to said complementary shaping surfaces, wherein the pressure resulting from sandwiching the glass sheet between said glass shaping members causes said glass supporting member to stress the glass sheet, the improvement comprising simultaneously imparting to said glass shaping members a component of motion parallel to the plane of the flat glass sheet during the interval between the time of initial contact between the sheet and said shaping members and the time the sheet is in complete pressurized contact between said shaping members, in a direction that diminishes any stress caused by contact between said glass supporting member and said glass sheet during said sandwiching.

5. In the art of bending glass sheets wherein a flat glass sheet is supported by a glass supporting member in a vertical plane, heated to its softening point and its major surfaces sandwiched between a pair of glass shaping members having complementary convex and concave shaping surfaces opposing one another to bend the glass sheet into a shape conforming to said complementary shaping surfaces, wherein the pressure resulting from sandwiching the glass sheet between said glass shaping members causes said glass supporting member to stress the glass sheet, the improvement comprising simultaneously imparting to said glass shaping members a component of motion parallel to the vertical plane of support for the flat glass sheet during the interval between the time of initial contact between the sheet and said shaping members and the time the sheet is in complete pressurized contact between said shaping members, in a direction that diminishes any stress caused by contact between said glass supporting members and said glass sheet during said sandwiching.

6. Apparatus for shaping glass sheets comprising a tunnel-like furnace, a glass shaping station disposed beyond said furnace, a conveyor extending through said furnace and said shaping station, means movable along said conveyor comprising means for supporting a glass sheet for movement through said tunnel-like furnace and said glass shaping station comprising a member engaging said glass sheet adjacent an edge thereof and a heat expandable and contractable member coupling said glass engaging member to said conveyor to permit said glass supporting means to move along said conveyor, said glass shaping station comprising complementary glass shaping members disposed on opposite sides of the major surfaces of said path of movement taken by a glass sheet supported by said glass sheet supporting means, said heat expandable and contractable member being subject to thermal contraction in a direcion parallel to the major surfaces of said glass sheet during the period when said glass shaping members are shaping said heated glass sheet which has been heat-softened during its conveyance through said tunnel-like furnace, means mounting said glass shaping members for movement toward one another in a direction providing a component of motion parallel to the plane of said sheet substantially equal to and in the direction of the thermal contraction of said glass support means during said shaping operation to said shaping members.

7. In an apparatus for shaping glass sheets including means for supporting a planar glass sheet heated to its softening temperature and having opposing major flat surfaces, a pair of opposed glass shaping members having complementary convex and concave shaping surfaces, each of said shaping surfaces being opposed to one of said major flat surfaces, for bending said glass sheet into a shape conforming to said complementary shaping surfaces wherein the pressure resulting from sandwiching the glass sheet between said glass shaping members causes said glass supporting member to stress the glass sheet during said bending, the improvement comprising:

means movable along a longitudinal axis for moving said glass shaping member having a concave shaping surface into engagement with the flat surface of the glass sheet opposed thereto, and means movable along a longitudinal axis for moving said glass shaping member having a convex shaping surface into engagement with the flat surface of said glass sheet opposed thereto, each of said glass shaping member moving means being positioned obliquely with respect to the plane of said glass sheet and in a direction that diminishes said stress caused by the engagement of said glass sheet by said glass shaping members and said glass support means during the bending of said glass sheet.

References Cited by the Examiner
UNITED STATES PATENTS 3,136,618   6/1964   Valchar et al. _____ 65—106
3,162,521  12/1964   Cypher _____ 65—106

DONALL H. SYLVESTER, *Primary Examiner.*

A. D. KELLOGG, *Assistant Examiner.*

UNITED STATES PATENT OFFICE
CERTIFICATE OF CORRECTION

Patent No. 3,290,133                            December 6, 1966

Dean L. Thomas

It is hereby certified that error appears in the above numbered patent requiring correction and that the said Letters Patent should read as corrected below.

Column 2, line 18, for "he" read -- the --; line 44, for "conact" read -- contact --; column 4, line 53, strike out "a"; column 5, line 14, strike out "the glass supporting means including" and insert the same after "of" in line 15; line 66, for "member" read -- members --; column 6, line 63, for "The" read -- In the --; column 8, line 7, strike out "it"; line 51, after "of", first occurrence, insert -- a --; same line 51, strike out "the major surfaces of said" and insert the same after "by", first occurrence, in line 52; same line 52, strike out "a".

(SEAL)          Signed and sealed this 26th day of November 1968.

Attest:

Edward M. Fletcher, Jr.                       EDWARD J. BRENNER

Attesting Officer                                 Commissioner of Patents